United States Patent
Tian et al.

(10) Patent No.: US 8,311,292 B2
(45) Date of Patent: Nov. 13, 2012

(54) CONTEXT AWARE, MULTIPLE TARGET IMAGE RECOGNITION

(75) Inventors: Dihong Tian, San Jose, CA (US); Wen-hsiung Chen, Sunnyvale, CA (US)

(73) Assignee: Cisco Technology, Inc., San Jose, CA (US)

( * ) Notice: Subject to any disclaimer, the term of this patent is extended or adjusted under 35 U.S.C. 154(b) by 949 days.

(21) Appl. No.: 12/367,981

(22) Filed: Feb. 9, 2009

(65) Prior Publication Data

US 2010/0202670 A1 Aug. 12, 2010

(51) Int. Cl.
*G06K 9/00* (2006.01)
*G06K 9/68* (2006.01)

(52) U.S. Cl. ........................ 382/118; 382/226

(58) Field of Classification Search .................. 382/118, 382/228, 229, 226, 115
See application file for complete search history.

(56) References Cited

U.S. PATENT DOCUMENTS

| | | | |
|---|---|---|---|
| 7,587,068 B1 * | 9/2009 | Steinberg et al. | 382/118 |
| 7,765,257 B2 * | 7/2010 | Chen et al. | 709/204 |
| 7,847,815 B2 * | 12/2010 | Patel et al. | 348/14.08 |
| 7,864,989 B2 * | 1/2011 | Song et al. | 382/116 |
| 2005/0289474 A1 * | 12/2005 | Master et al. | 715/765 |
| 2007/0174272 A1 | 7/2007 | Carter et al. | 707/5 |
| 2007/0188597 A1 | 8/2007 | Kenoyer | 348/14.08 |
| 2008/0088698 A1 | 4/2008 | Patel et al. | 348/14.09 |
| 2009/0327433 A1 * | 12/2009 | Comertoglu et al. | 709/206 |

OTHER PUBLICATIONS

Tuyuan, Source—www.tuyuan.com, downloaded Dec. 12, 2008, (includes English translation and translator's certificate for a total of 3 pages).
U.S. Appl. No. 11/939,289, filed Nov. 13, 2007, Khouri et al.
Davis, Marc, Smith, Michael, Canny, John, Good, Nathan, King, Simon, Janakiraman, Rajkumar, Towards Context-Aware Face Recognition, ACM, 2005.
Hartzer, Bill, Raxxle Beta Availability of Social Networking Community Using Facial Recognition, www.raxxle.com, dated Nov. 2007.
ActiveSymbols website, Source—www.activesymbols.com (re-directed to eyealike.com) downloaded Feb. 4, 2009.
Polar Rose website, Source—www.polarrose.com, downloaded Feb. 4, 2009.
Autotagging Facebook: Social Network Context Improves Photo Annotation, Source—www.eecs.harvard.edu, downloaded Feb. 4, 2009.
Alpha-beta pruning, Source—http://en.wikipedia.orq/wiki/Alpha-beta_pruning, downloaded Nov. 30, 2008.
Pruning (algorithm), Source—http://en.wikipedia.org/wiki/Pruning_%28algorithm%29, downloaded Nov. 30, 2008.

* cited by examiner

*Primary Examiner* — Daniel Mariam
(74) *Attorney, Agent, or Firm* — Brinks Hofer Gilson & Lione (57) ABSTRACT

In one embodiment, an apparatus may receive at least one image in which multiple targets are represented. The apparatus may assign possible identities to the targets based on probabilities associated with the identities. The apparatus may base a probability of a target being one of the identities, at least in part, on an identity-specific context and on a conditional probability that the target is the identity given that each one of at least two other of the targets is another respective one of the identities. The identity-specific context may be information that relates to a determined identity. The apparatus may identify the targets based on the identities and on the probabilities associated with the identities.

20 Claims, 4 Drawing Sheets

CONTEXT AWARE, MULTIPLE TARGET IMAGE RECOGNITION

TECHNICAL FIELD

The present disclosure relates generally to image recognition and, in particular, to multiple target image recognition.

BACKGROUND

Facial recognition may be useful in areas such as social networking and video conferencing in addition to more traditional areas, such as video surveillance. For example, in social networking, facial recognition technology may be employed to find people who look alike or to tag and search photos with people's names. In video conferencing, facial recognition technology may identify meeting participants. The identities of the participants may be utilized to enhance the meeting experience and facilitate face-to-face interaction.

In a typical facial recognition algorithm, biometric characteristics of each target are analyzed against a facial image database. If there are multiple targets, each one of the targets may be analyzed individually.

BRIEF DESCRIPTION OF THE DRAWINGS

The components and the figures are not necessarily to scale, emphasis instead being placed upon illustrating the principles of the invention. Moreover, in the figures, like-referenced numerals designate corresponding parts throughout the different views.

DESCRIPTION OF EXAMPLE EMBODIMENTS

Overview

By way of introduction, the example embodiments described below include an apparatus, logic encoded in a computer readable media, and a method to identify multiple targets in one or more images.

According to a first aspect, an apparatus may receive at least one image in which multiple targets are represented. The apparatus may identify the targets based on confidence scores determined from probabilities, where each one of the probabilities is associated with one of multiple nodes arranged in a tree structure. The nodes, other than a root node, may be arranged in levels, where each one of the levels corresponds to a respective one of the targets. Each one of the nodes included in any one of the levels may correspond to a possible identity of the respective one of the targets. A first level may be a level closest to the root node in the tree structure. The first level may include first level nodes corresponding to one of the targets that is analyzed first. Any set of nodes on a path that starts at, but excludes, the root node and that includes only one node in each respective one of the levels, corresponds to a set of possible identities of the targets. For each one of the nodes on the path other than a first level node, the apparatus may determine a corresponding one of the probabilities based on a biometric score, on an identity-specific context, and on a conditional probability that the respective one of the targets is the possible identity given that analyzed nodes on the path correctly identify corresponding targets. The analyzed nodes may be nodes that are both on the path and closer to the root node in the tree structure.

In a second aspect, logic encoded in one or more tangible media, when executed, may receive at least one image, where targets are represented in the at least one image. When executed, the encoded logic may also assign identities to the targets based on probabilities associated with the identities. The encoded logic, when executed, may also base, at least in part, a probability of at least one of the targets being one of the identities on an identity-specific context and on a conditional probability that the at least one of the targets is the one of the identities given each one of at least two other of the targets is a respective other one of the identities. The encoded logic when executed may further identity the targets based on the identities and on the probabilities associated with the identities.

In a third aspect, a method is provided. A likelihood that a first target, a second target, and a third target are a first possible identity, a second possible identity, and a third possible identity respectively may be determined. The first target, the second target, and the third target may be in a first image, a second image, and a third image respectively. The likelihood may be determined by determining a first probability, a second probability and a third probability. The first probability may be a probability that the first target is the first identity. The first probability may be based on a first biometric score of the first identity and on first context information related to the first identity. The second probability may be a probability that the second target is the second identity. The second probability may be based on a second biometric score of the second identity, on second context information related to the second identity, and on a first conditional probability that the second target is the second identity given that the first target is the first identity. The third probability may be a probability that the third target is the third identity. The third probability may be based on a third biometric score of the third identity, on a third context information related to the third identity, and on a second conditional probability that the third target is the third identity given that the first target is the first identity and given the second target is the second identity. The first target, the second target, and the third target may be identified based at least in part on the likelihood that the first target, the second target, and the third target are the first possible identity, the second possible identity, and the third possible identity respectively. The present invention is defined by the following claims, and nothing in this section should be taken as a limitation on those claims. Further aspects and advantages of the invention are discussed below in conjunction with the example embodiments.

EXAMPLE EMBODIMENTS

In one introductory example, multiple targets may be analyzed together instead of individually. Additionally, an application context within a software application may be combined with biometric characteristics and a probabilistic framework to more accurately and/or efficiently identify the targets.

The application context may be information about one or more targets obtained from the software application that may make the target or targets more or less likely to appear in an image obtained in relation to the software application. For example, the application context may be information about the targets, the connections between the targets, and/or an event in which the targets participate or are involved. The application context may be taken into account to accelerate the search in a facial image database and improve the recognition accuracy of the targets by limiting the search to identities matching the application context.

In social networking, examples of the application context include connections of a user in a community of users, preferences of the user, and past video chat sessions involving the user. In a video conferencing example, examples of the application context include a meeting schedule, a meeting topic, names of invitees, previously held similar video conferences, and a corporate directory that identifies organizations of employees.

The probabilistic framework may be a process to identify the targets that is grounded in probability theory. The probabilistic framework may include a process of sequentially analyzing the targets. For example, possible identities for a first target may be determined and optionally narrowed before analyzing possible identities of a second target. When analyzing the possible identities of the second target, the probability that the second target is one of the possible identities may be based at least in part on a conditional probability that the second target is one of the possible identities of the second target given that the first target is identified as one or more of the possible identities of the first target. Mathematically, conditional probability is the probability of some event A, given the occurrence of some other event B. Conditional probability may be written P(A|B), and may be read "the probability of A, given B." In contrast, joint probability is the probability of both events occurring together. The number of possible identities of the second target may be reduced by ceasing to analyze any of the possible identities that have a low likelihood of being the second target. As each additional one of the targets is analyzed, the possible identities of the additional targets may also be similarly limited. The probability of an additional target being one of the identities may be based in part on a conditional probability that the additional target is a respective one of the possible identities given that the previous targets were identified as a set of determined identities.

Figure 1:
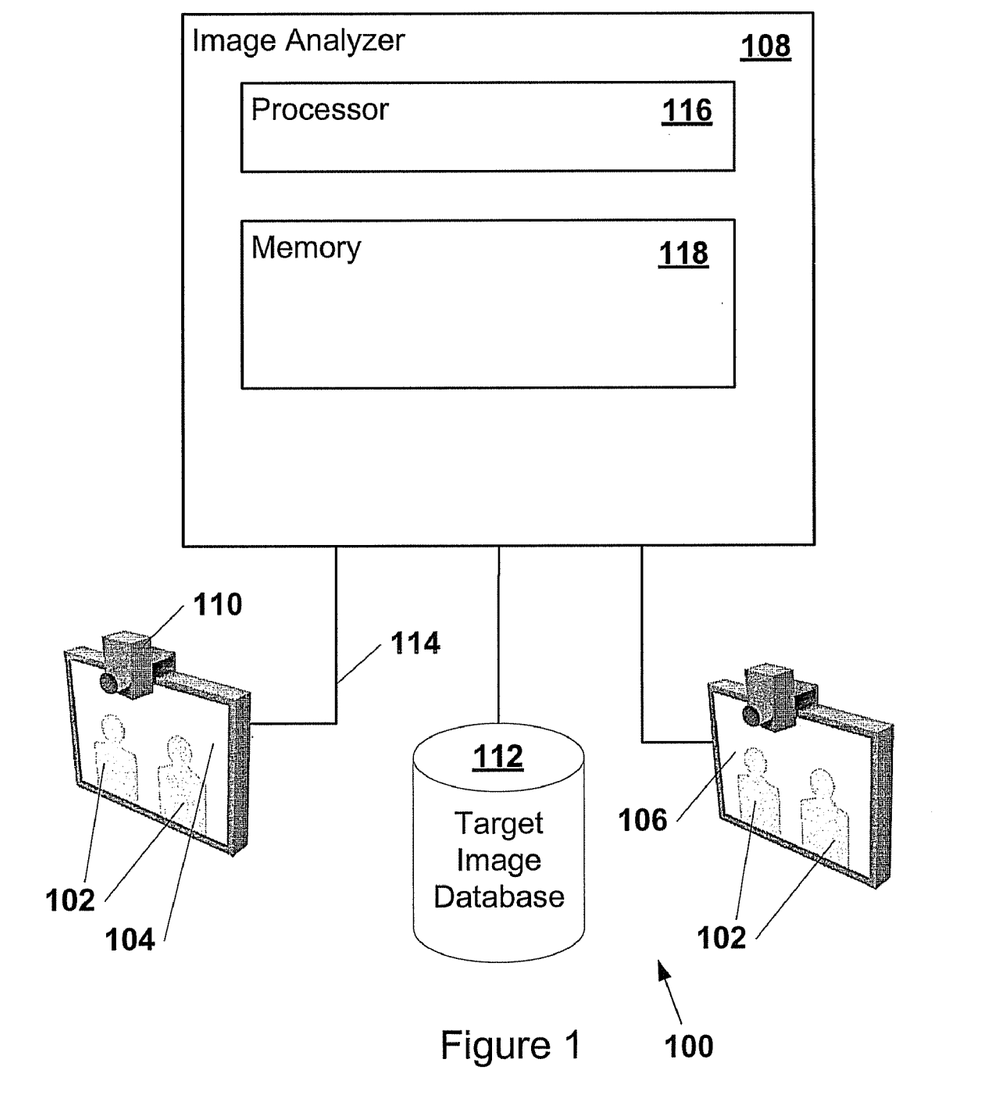
FIG. 1 illustrates a system to identify targets in images.

FIG. 1 illustrates a system 100 to identify targets 102 in images 104 and 106. The system 100 may include an image analyzer 108, one or more image sources 110, and a target image database 112. The system 100 may include additional, different, or fewer components. For example, the system 100 may additionally include a network 114 over which the image analyzer 108 communicates with the one or more image sources 110.

Each one of the targets 102 may be any identifiable object, such as a person, an animal, an inanimate object, a plant, a building, or any portion thereof, such as a face, a retina, or a fingerprint. Each one of the images 104 and 106 may be an electronic representation of a physical appearance of any one or more of the targets 102, such as a still image or a video. The electronic representation may be in any format now known or later discovered, such as Joint Photographic Experts Group (JPEG), Tagged Image File Format (TIFF), or Moving Picture Expert Group (MPEG).

The image analyzer 108 may be any device or combination of devices that may analyze images 104 and 106 and identify targets 102 within the images 104 and 106. The image analyzer 108 may include a processor 116 and a memory 118. Examples of the image analyzer 108 may include a computer, a laptop, a server cluster, and a video conference bridge.

The memory 118 may be any now known, or later discovered, data storage device. The memory 118 may be a non-volatile and/or volatile memory, such as a random access memory (RAM), a read-only memory (ROM), an erasable programmable read-only memory (EPROM), or flash memory. The memory 118 may include an optical, magnetic (hard-drive) or any other form of data storage device.

The processor 116 may be in communication with the memory 118. The processor 116 may also be in communication with additional components, such as a display and the network 114. The processor 116 may be a general processor, central processing unit, server, application specific integrated circuit (ASIC), digital signal processor, field programmable gate array (FPGA), digital circuit, analog circuit, or combinations thereof. The processor 116 may be one or more devices operable to execute computer executable instructions or computer code embodied in the memory 118.

The memory 118 may include computer code. The computer code may include instructions executable with the processor 116. The computer code may include embedded logic. The computer code may be written in any computer language now known or later discovered, such as C++, C#, Java, Pascal, Visual Basic, Perl, HyperText Markup Language (HTML), JavaScript, assembly language, and any combination thereof.

The one or more image sources 110 may be any device or combination of devices that may capture and/or store images 104 and 106. Examples of one of the images sources 110 include a digital camera, a video camera, an optical disk drive, and a hard drive.

The target image database 112 may be any database that includes information about possible identities to be matched with targets 102. For example, the information about the targets 102 may include biometric characteristics and/or application context information. Alternatively, the target image database 112 includes labeled images of the targets 102.

The target image database 112 may include a memory, such as the memory 118 included in the image analyzer 108, with any electronic collection of information stored therein. The information may be organized so that the information may be accessed, managed, and updated. Examples of the target image database 112 include but are not limited to a Relational Database Management System (RDBMS), an object-oriented database, an extensible markup language (XML) database, a file system, memory structures, or other now known or later developed data organization and storage mechanism. The target image database 112 may use any type of memory and structure, such as a random access memory (RAM), a read-only memory (ROM), an erasable programmable read-only memory (EPROM), flash memory, optical memory, magnetic (hard-drive or tape) memory or other memory device.

The application context information may include identity-specific context and cross identity context. Identity-specific context, which may be referred to as vertical context, may be information that relates to a determined identity. Thus, the vertical context may be used to derive a likelihood of a target being the determined identity independent of the identity of other targets. The vertical context may, for example, help identify the target when the target has the same or close matching biometric scores as multiple identities in the target image database. In another example, the vertical context may include a frequency at which the determined identity attended conferences on a topic related to a subject matter of a video conference session, and where the images 104 and 106 were obtained during the video conference session.

In contrast to the identity-specific context, the cross identity context, which may be referred to as horizontal context, may include information that reveals connections between two or more identities. Thus, the horizontal context may be used to determine a conditional probability that one of the targets 102 is a determined identity given that one or more other targets 102 are identified as a determined set of identities.

The network 114 may be a Local Area Network (LAN), a Wireless Local Area Network (WLAN), a Personal Area Network (PAN), a Wide Area Network (WAN), or any other now known or later developed communications network.

During operation, the image analyzer 108 may receive and/or retrieve images 104 and 106 from the one or more image sources 110. The image analyzer 108 may determine that one or more targets 102 are included in each one of the images 104 and 106. In one example, the image analyzer 108 may analyze the targets 102 found in the images 104 and 106 together as one group of targets. In a different example, multiple targets 102 found in one of the images 104 and 106 may be analyzed together as one group of targets, but separately from the targets 102 found in the other images.

The image analyzer 108 may analyze the group of targets to determine the likelihood that the group of targets may be identified as a determined set of corresponding identities. As a result, the image analyzer 108 may generate a likelihood score. The image analyzer 108 may repeat the analysis for multiple sets of corresponding identities in order to determine multiple likelihood scores for each one of the sets of corresponding identities. The image analyzer 108 may then determine the identities of the targets 102 in the group of targets as the set of corresponding identities with the highest one of the likelihoods of identifying the targets 102.

For example, the image analyzer 108 may determine a likelihood that a first target, a second target, and a third target are a first possible identity, a second possible identity, and a third possible identity respectively, where the first target, the second target, and the third target are in a first image, a second image, and a third image respectively. The first possible identity may be an identity selected from a set of possible identities of the first target. Correspondingly, the second possible identity and the third possible identity are identities selected from sets of possible identities of the first and second targets respectively.

In particular, the image analyzer 108 may determine a confidence score indicating the likelihood that the first target, the second target, and the third target are the first possible identity, the second possible identity, and the third possible identity respectively by calculating a set of probabilities and then calculating the confidence score from the set of probabilities. For example, the set of probabilities may include a probability corresponding to each respective one of the three targets: a first probability, a second probability, and a third probability. In one example, the confidence score may be calculated by multiplying each one of the probabilities in the set of probabilities together. In a different example, one or more of the probabilities in the set of probabilities may be weighted.

The image analyzer 108 may determine the first probability as the probability that the first target is the first identity. The first probability may be based on a biometric score of the first identity and on a vertical context score of the first identity. The biometric score may be a probability that the first target is the first identity based on a comparison of biometric characteristics of the first identity with biometric characteristics of the first target. The vertical context score of the first identity may be the probability that the first target is the first identity based on identity-specific information, such as whether the first identity is a registered participant of a video conference from which the first image was received. In one example, the first probability may be the product of the biometric score and the vertical context score. In a second example, the biometric score and/or the vertical context score may be weighted to change the impact of the biometric score, and/or of the vertical context score, on the first probability.

The image analyzer 108 may determine the second probability as a probability that the second target is the second identity. The second probability may be based on: (1) the biometric score of the second identity, (2) the vertical context score of the second identity, and (3) a horizontal context score that is a conditional probability that the second target is the second identity given that the first target is the first identity.

The biometric score of the second identity may be the probability that the second target is the second identity based on a comparison of biometric characteristics of the second identity and biometric characteristics of the second target. The vertical context score of the second identity may be the probability that the second target is the second identity based on identity-specific context information about the second identity, such as whether the second identity works in a building in which the video conference is scheduled.

The horizontal context score of the second identity may be the conditional probability that the second target is the second identity given that the first target is the first identity. The image analyzer 108 may determine the horizontal context score using horizontal context information. Consequently, for example, if the second identity has attended nearly all of the video conference sessions in which the first identity has attended, then the horizontal context score of the second identity may be high for the current video conference session given that the first target is the first identity.

The image analyzer 108 may determine the third probability as a probability that the third target is the third identity. The third probability may be based on: (1) a biometric score of the third identity, (2) a vertical context score of the third identity, and (3) a horizontal context score that is a conditional probability that the third target is the third identity given that the first target is the first identity, and the second target is the second identity.

The confidence score may be based on the probabilities determined for each one of the possible identities. The image analyzer 108 may also determine multiple confidence scores by selecting the first possible identity, the second possible identity, and the third possible identity from a first set of identities, a second set of identities, and a third set of identities respectively. Consequently, the analyzer 108 may identify the first target, the second target, and the third target based on finding a highest one of the confidence scores. The possible identities associated with the highest one of the confidence scores may be the identities of the three targets.

The example of identifying the three targets described above may be extended to identify more than three targets. For example, the process may start with an initial state when no target has yet been analyzed. Next, a set of possible identities may be associated with the first target. The image analyzer 108 may, for each one of the possible identities in the set, calculate a probability associated with the corresponding one of identities by multiplying the biometric score of the identity with the vertical context score of the identity. Then, a second set of possible identities for each respective one of the possible identities associated with the first target may be associated with the second target. The image analyzer 108 may, for each one of the identities in the second set, calculate a probability associated with the respective one of the identities by multiplying the biometric score of the identity with both the vertical context score of the identity and the horizontal score of the identity. The process may be continued until identities and associated probabilities have been determined for each one of the targets 102. In another example, matches may be determined for all or a sub-set of participants of a conference call without basing corresponding probabilities on the horizontal context. The horizontal context may then be applied for each target of the all or sub-set of participants to refine the probabilities.

As a result of the example process described above, a probabilistic tree may be created where each path in the tree represents a joint recognition of multiple targets. Each one of the joint recognitions of the multiple targets may have a corresponding confidence score. To accelerate the process, unlikely paths, for example those paths with low confidence scores, may be discarded early during the process. In one example, an optimal recognition result may be reached by selecting the path in the probabilistic tree that has the highest confidence score using fast search algorithms such as dynamic programming. Dynamic programming is a phrase in computer science, which refers to a method of solving problems exhibiting the properties of overlapping sub-problems and optimal substructure that takes less time to solve than naive methods. In different examples, different optimal recognition results may be obtained using different algorithms.

Figure 2:
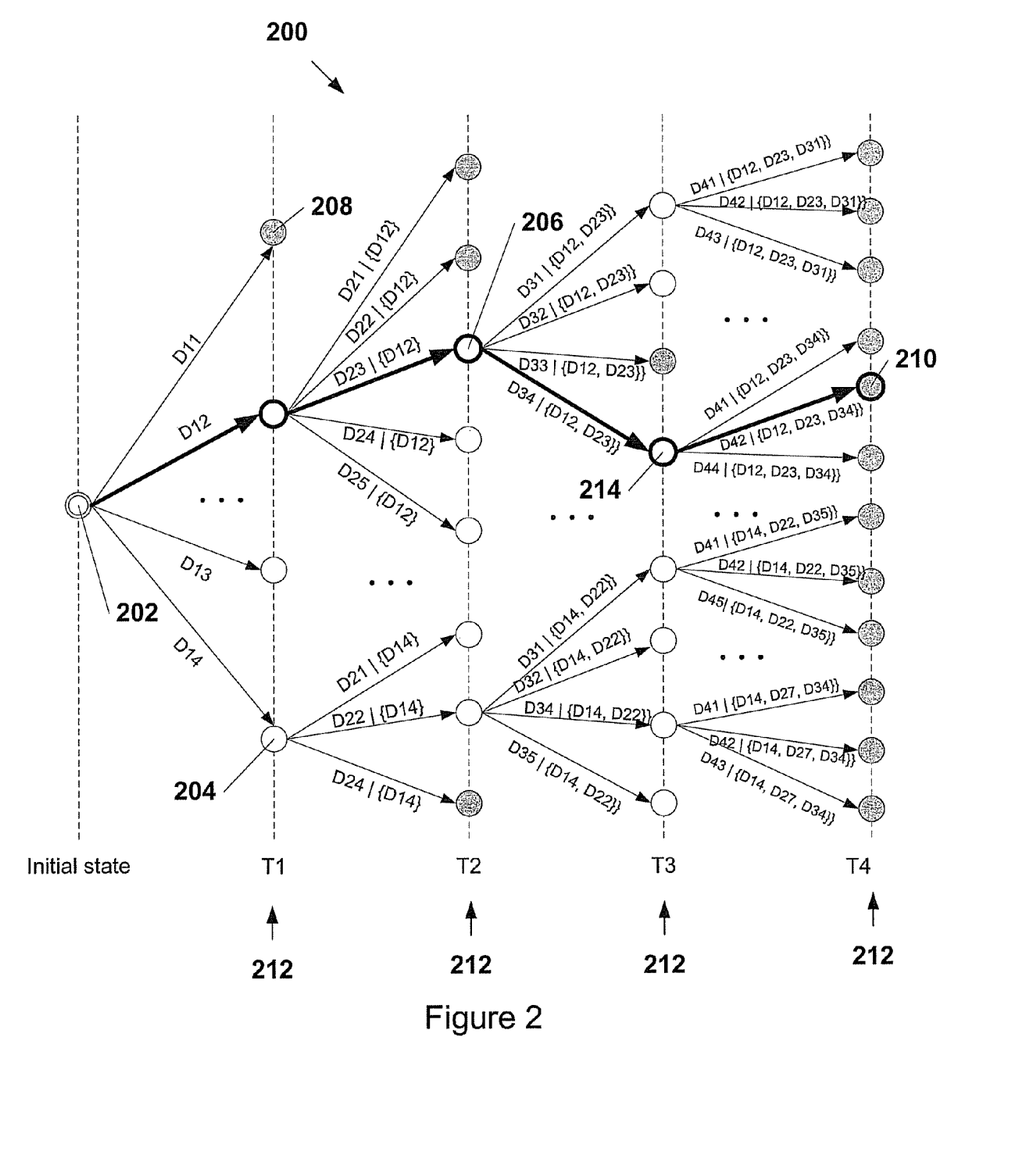
FIG. 2 illustrates an example tree structure that represents a probabilistic tree used to identify multiple targets.

FIG. 2 illustrates an example of tree structure 200 that represents a probabilistic tree used to identify multiple targets. The tree structure 200 may have a root node 202 that represents an initial state when the targets 102 have not yet been analyzed. Each one of the nodes 204, 206, 208, and 210 other than the root node 202 may correspond to one of the possible identities of one of the targets 102. Other than the root node 202, each one of the nodes may have a single parent node. Each of the nodes may have zero, one, or more than one child nodes. The nodes may be interconnected by branches. The nodes 204, 206, 208, and 210 in tree structure 200 other than the root node 202 may be arranged in layers 212. Each one of the layers 212 may correspond to one of the targets 102. In FIG. 2, each one of the layers 212 corresponds to a respective one of the targets 102 that is individually designated T1, T2, T3, and T4, respectively. Each one of the possible identities corresponding to one of the targets 102 is individually designated {Dij}, where i indicates which one of the targets 102 that the corresponding identity is a possible candidate for, and j identifies the identity from amongst the set of possible identities for the i-th target.

For example, D14 is a designation of the fourth possible identity of the target T1. D23 is a designation of the third possible identity of the target T2. In a first example, the set of possible identities for one of the targets 102 may be the same as the set of possible identities for a different one of the targets 102. In an alternative example, the set of possible identities for each one of the targets 102 is different from the set of possible identities of a different one of the targets 102, such as due to context. In a second example, two or more of the sets of possible identities for the targets 102 may include one or more of the same possible identities.

During operation, the image analyzer 108 may create a node corresponding to each one of the possible identities of target T1. The image analyzer 108 may associate a probability with each one of the nodes corresponding to a respective one of the possible identities of target T1. For example, the associated probability may be the probability that target T1 is the corresponding identity, D1j, based on the biometric score of D1j and on the vertical context score of D1j.

The image analyzer 108 may select T1 from among the targets 102 using various methods. For example, the selection may be random. In another example, the selection may be the target that includes the identity with the maximum biometric score from among Dij. In yet another example, the selection may be the target that includes the identity with the maximum vertical context score from among Dij.

For each one of the nodes corresponding to D1j, the image analyzer 108 may create a set of child nodes that correspond to possible identities of target T2 given that target T1 is identified as D1j. For example, child nodes of the node corresponding to D12 are created for the possible identities D21, D22, D23, D24, and D25 of target T2 given that target T1 is identified as D12.

Each darkly shaded node 208 in the tree structure 200 may represent a termination of an analysis path. The termination of the analysis path may occur if the probability associated with the node 208 is below a determined threshold. In such a case, the image analyzer 108 may not create the set of child nodes that correspond to possible identities of target T2 given that target T1 is identified as D1j.

The image analyzer 108 may associate a probability with each one of the child nodes. For example, identity D12 may correspond to a node that has child node 206, where the child node 206 corresponds to identity D23. The probability associated with that child node 206 may be the probability that target T2 is D23 given that target T1 is D12. The probably may be determined based on the biometric score of D23, the vertical context score of D23, and the horizontal score of D23.

The image analyzer 108 may repeat the process of creating child nodes for each possible identity of one of the targets 102 given the identification of the targets 102 as determined by the nodes higher in the tree structure 200. Nodes higher in the tree structure 200 may be nodes closer to the root node 202 than the node under analysis and that are on the same direct path from the root node to the node under analysis.

A complete path may represent a successful joint recognition. A complete path may start at the root node 202 and include exactly one node in each respective one of the levels 212. A confidence score may be associated with each complete path. The confidence score may be based on the probabilities associated with the nodes on the path. The complete path with the maximum associated confidence score may represent the most likely set of identities of the targets 102. For example, the bold path 214 in FIG. 2 represents the path having the highest associated confidence score. Thus, in FIG. 2, the identities of the four targets have been determined to be D12, D23, D34, and D42 respectively.

Figure 3:
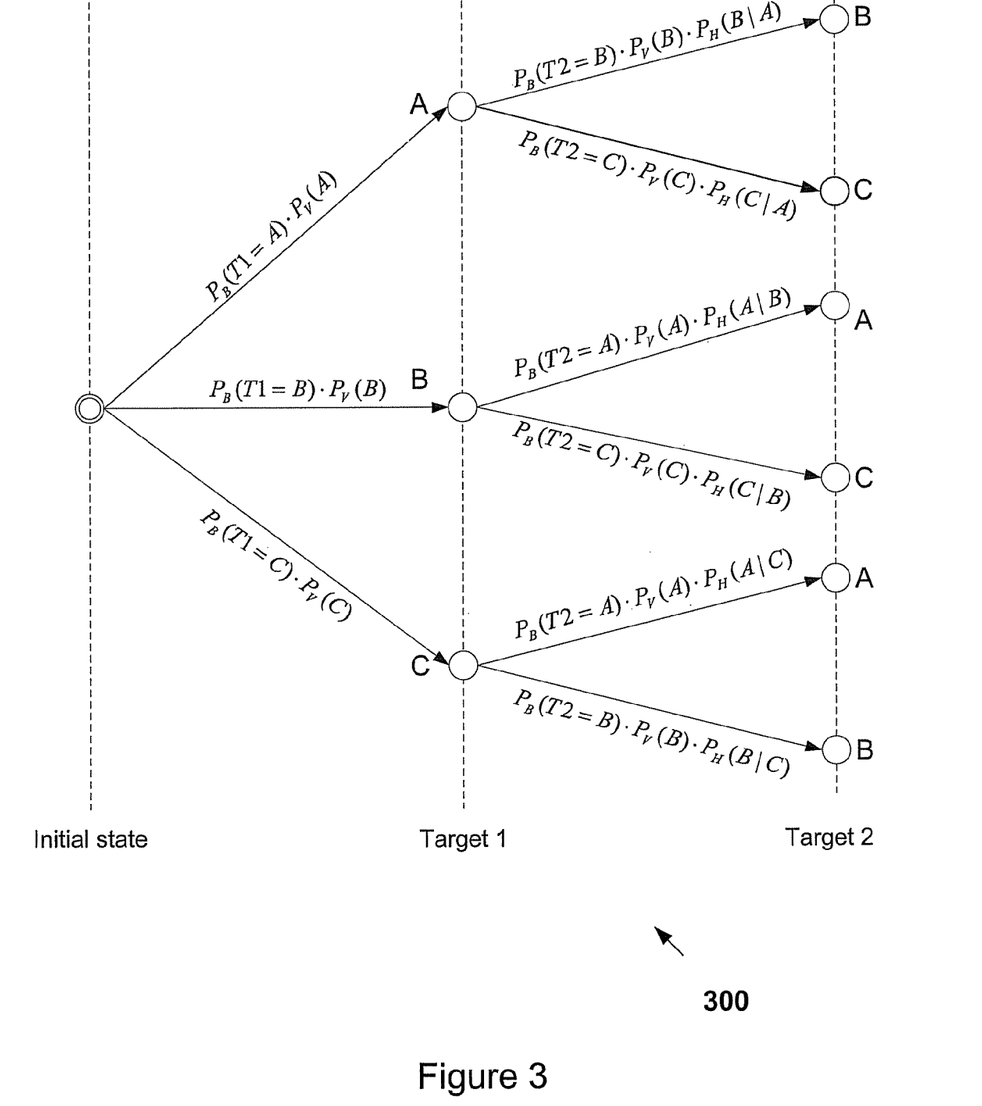
FIG. 3 illustrates an example tree structure that represents a probabilistic tree used to identify two targets.

FIG. 3 illustrates an example of tree structure 300 that represents a probabilistic tree used to identify two targets though a process of joint recognition. In one example, $P_B(Ti=x)$ denotes the biometric score of target i being identity x, and is normalized among the possible identities for target i such that their summation equals 1. $P_V(x)$ denotes the vertical context score of identity x. $P_H(x|y)$ denotes the horizontal context score of identity x given identity y. In a video conference example, $P_V(x)$ may be calculated as the percentage of previous conference sessions with the same subject matter in which identity x was found; $P_H(x|y)$ may be calculated as the percentage of previous conference sessions where identity y was present and in which identity x was found. In one example, $P_V(x)$ may be normalized among the set of possible identities for all the targets such that their summation equals 1; for each y among the set of possible identities for all the targets, respectively, $P_H(x|y)$ may be normalized among the set of possible identities for all the targets such that their summation equals 1. In the example illustrated in FIG. 3, the set of possible identities of target 1 is the same as the set of possible identities of target 2. The set of possible identities for each one of the targets 102 includes identities A, B, and C. Also in the example illustrated in FIG. 3, the biometric score $P_B(Ti=x)$, the vertical context score $P_V(x)$, and the horizontal context score $P_H(x|y)$, when present, are directly multiplied to obtain the confidence score of target i being identity x. In another example, the three scores may be weighted differently prior to the multiplication.

Figure 4:
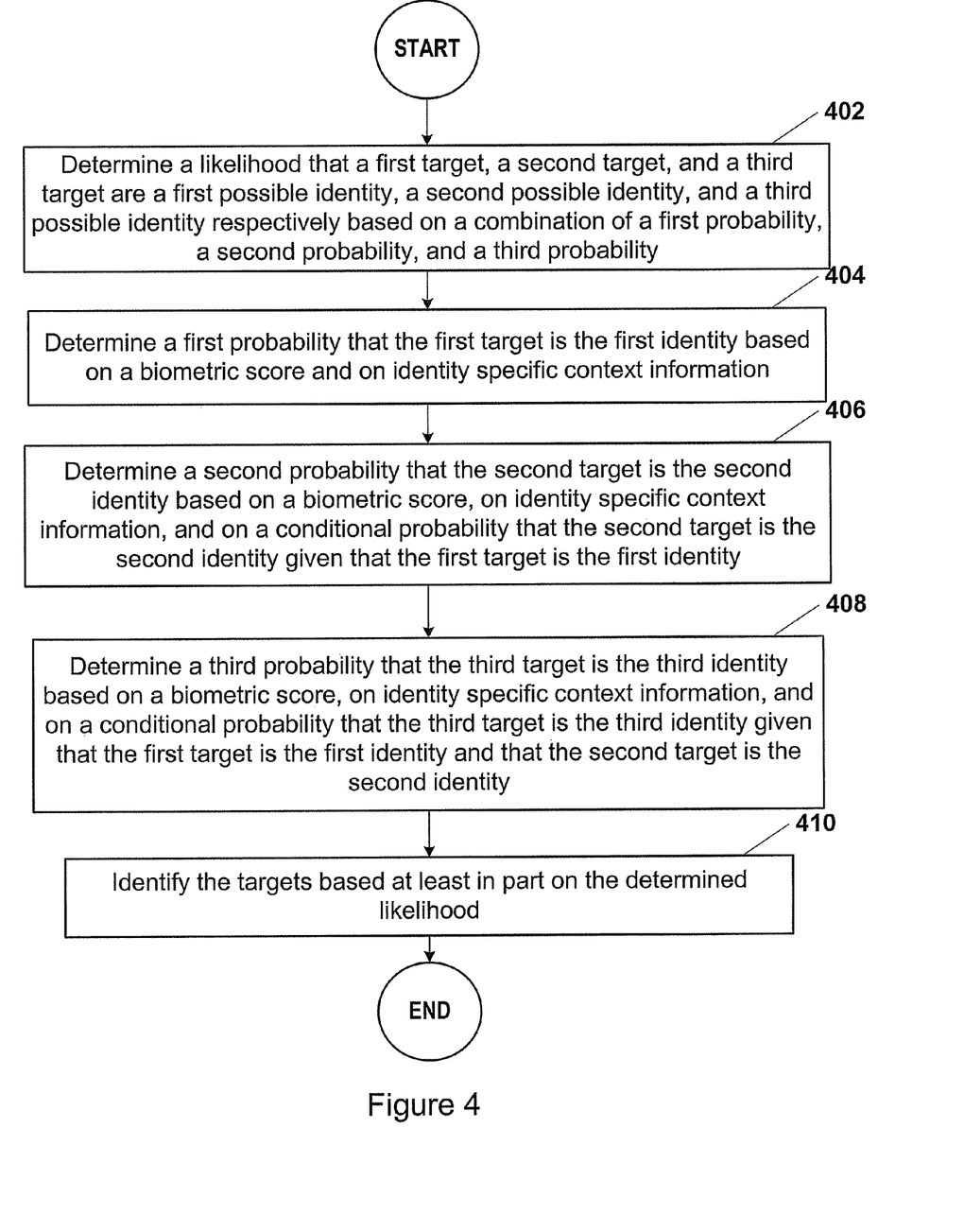
FIG. 4 illustrates one embodiment of a method to identify multiple targets.

FIG. 4 illustrates one embodiment of a method to identify multiple targets. Additional, different, or fewer acts may be performed. The acts may be performed in a different order than illustrated in FIG. 4.

In act 402 of the embodiment illustrated in FIG. 4, the operation may begin by determining a likelihood that a first target, a second target, and a third target are a first possible identity, a second possible identity, and a third possible identity respectively based on a combination of a first probability, a second probability, and a third probability. For example, the first probability, the second probability, and the third probability may be multiplied to obtain the likelihood that the targets are the respective possible identities.

The first probability may be a probability that the first target is the first identity. The second probability may be a probability that the second target is the second identity. The third probability may be a probability that the third target is the third identity.

The operation may continue in act 404 by determining a first probability that the first target is the first identity based on a biometric score and on identity-specific context information. In one example, the identity-specific context information may be used to determine a vertical context score of the first identity.

In act 406, the operation may continue by determining the second probability based on a biometric score of the second identity, on identity-specific context information related to the second identity, and on a conditional probability that the second target is the second identity given that the first target is the first identity.

In act 408, the operation may continue by determining the third probability based on a biometric score of the third identity, on identity-specific information related to the third identity, and on a conditional probability that the third target is the third identity given that the first target is the first identity and that the second target is the second identity.

The method may also include additional acts of similarly determining additional probabilities for additional possible identities and/or for additional targets.

In act 410, the operation may complete by identifying the first target, the second target, and the third target based at least in part on the determined likelihood that the first target, the second target, and the third target are the first possible identity, the second possible identity, and the third possible identity respectively based on the first probability, the second probability, and the third probability. Where additional probabilities and/or targets are analyzed, the operation may complete by identifying the targets, which include the additional targets, based on the additional probabilities determined.

Different components provide different functions for implementing the functionality of the various embodiments. The respective logic, software or instructions for implementing the processes, methods and/or techniques discussed above are provided on computer-readable storage media or memories or other tangible media, such as a cache, buffer, RAM, removable media, hard drive, other computer readable storage media, or any other tangible media or any combination thereof. The tangible media include various types of volatile and nonvolatile storage media. The functions, acts or tasks illustrated in the figures or described herein are executed in response to one or more sets of logic or instructions stored in or on computer readable storage media. The functions, acts or tasks are independent of the particular type of instructions set, storage media, processor or processing strategy and may be performed by software, hardware, integrated circuits, firmware, micro code and the like, operating alone or in combination. Likewise, processing strategies may include multiprocessing, multitasking, parallel processing and the like. In one embodiment, the instructions are stored on a removable media device for reading by local or remote systems. In other embodiments, the logic or instructions are stored in a remote location for transfer through a computer network or over telephone lines. In yet other embodiments, the logic or instructions are stored within a given computer, central processing unit ("CPU"), graphics processing unit ("GPU"), or system. Logic encoded in one or more tangible media for execution is defined as instructions that are executable by the processor and that are provided on the computer-readable storage media, memories, or a combination thereof.

Any of the devices, features, methods, and/or techniques described may be mixed and matched to create different systems and methodologies.

While the invention has been described above by reference to various embodiments, it should be understood that many changes and modifications can be made without departing from the scope of the invention. It is therefore intended that the foregoing detailed description be regarded as illustrative rather than limiting, and that it be understood that it is the following claims, including all equivalents, that are intended to define the spirit and scope of this invention.

What is claimed is:

1. An apparatus comprising:
   a memory; and
   a processor in communication with the memory, the memory including computer code executable with the processor, wherein the computer code is configured to:
   receive at least one image, wherein a plurality of targets are represented in the at least one image;
   identify the targets based on a plurality of confidence scores determined from a plurality of probabilities, wherein each one of the probabilities is associated with a respective one of a plurality of nodes arranged in a tree structure, the nodes other than a root node are arranged in a plurality of levels, each one of the levels corresponds to a respective one of the targets, each one of the nodes included in any one of the levels corresponds to a possible identity of the respective one of the targets, any set of nodes on a path starting at but excluding the root node and including only one node in each respective one of the levels corresponds to a set of possible identities of the targets; and
   for at least two of the nodes on the path, determine a corresponding one of the probabilities based on a biometric score, on an identity-specific context, and on a conditional probability that the respective one of the targets is the possible identity of the respective one of the targets given that a plurality of analyzed nodes on the path correctly identify corresponding targets, wherein the analyzed nodes are nodes both on the path and closer to the root node in the tree structure.

2. The apparatus of claim 1, wherein for each one of the nodes on the path, the biometric score is a first biometric score, and wherein the computer code is further configured to:
   create the nodes in a level of the tree structure closest to the root node to correspond to a plurality of possible identities of a first target; and
   determine the probabilities associated with the nodes in the level closest to the root node based on a second biometric score of a respective one of the plurality of possible identities of the first target and on context information related to the respective one of the plurality of possible identities of the first target.

3. The apparatus of claim 1, wherein a confidence score indicative of a probability that the targets are identified as the set of possible identities is determined from the probabilities associated with the set of nodes on the path, and wherein the targets are identified as the set of possible identities having a highest one of the confidence scores.

4. The apparatus of claim 1, wherein each one of the targets is a person and the at least one image includes a plurality of images of faces.

5. The apparatus of claim 1, wherein each one of the targets is a person, the biometric score is determined from fingerprint data, and the at least one image includes a plurality of images of fingerprints.

6. The apparatus of claim 1, wherein each one of the targets is represented in a different respective one of a plurality of images.

7. The apparatus of claim 1, wherein the at least one image is included in video conferencing session.

8. The apparatus of claim 1, wherein for each one of the nodes on the path, the conditional probability is based on information indicative of a connection between the possible identity of the respective one of the targets and identities corresponding to nodes both on the path and higher in the tree structure.

9. Logic encoded in one or more non-transitory tangible media for execution with a processor and when executed operable to:
receive at least one image, wherein a plurality of targets are represented in the at least one image;
assign a plurality of identities to the targets based on a plurality of probabilities associated with the identities;
base, at least in part, a probability of a target being one of the identities on an identity-specific context and on a conditional probability that the target is the one of the identities given that each one of at least two other of the targets is a respective other one of the identities; and
identify the targets based on the identities and on the probabilities associated with the identities.

10. The tangible media of claim 9, wherein the logic encoded therein when executed is further operable to assign the identities to the targets one target at a time.

11. The tangible media of claim 9, wherein the logic encoded therein when executed is further operable to assign an identity to a target only if a probability associated with the identity is above a determined threshold.

12. The tangible media of claim 9, wherein the identity-specific context includes a frequency at which an identity attended conferences on a topic related to a subject matter of a video conference session, and wherein the at least one image was obtained during the video conference session.

13. The tangible media of claim 9, wherein each one of the targets is represented in a different respective one of a plurality of images.

14. A method comprising:
determining a likelihood that a first target, a second target, and a third target are a first possible identity, a second possible identity, and a third possible identity respectively, wherein the first target, the second target, and the third target are in a first image, a second image, and a third image respectively, and wherein determining the likelihood includes:
determining a first probability that the first target is the first identity;
determining a second probability that the second target is the second identity, basing, at least in part, the second probability on a first context information related to the second identity, and on a first conditional probability that the second target is the second identity given the first target is the first identity; and
determining a third probability that the third target is the third identity, basing, at least in part, the third probability on a second context information related to the third identity, and on a second conditional probability that the third target is the third identity given the first target is the first identity and given the second target is the second identity; and
identifying the first target, the second target, and the third target based at least in part on the likelihood that the first target, the second target, and the third target are the first possible identity, the second possible identity, and the third possible identity respectively.

15. The method of claim 14 further comprising:
repeating the step of the determining the likelihood that the first target, the second target, and the third target are the first possible identity, the second possible identity, and the third possible identity respectively in order to generate a plurality likelihoods, but substituting alternative identities for the first possible identity, the second possible identity, and the third possible identity respectively for each repetition, wherein substituting the alternative identities includes selecting the different identities from a first set of identities, a second set of identities, and a third set of identifies respectively; and
identifying the first target, the second target, and the third target based on a highest one of the likelihoods generated.

16. The method of claim 14 further comprising extracting the first image, the second image, and the third image from a single image.

17. The method of claim 14 further comprising selecting the first target from among a plurality of targets based on a best-matched biometric score obtained from a comparison of a plurality of candidate identities and the targets.

18. The method of claim 14, wherein determining the second probability includes weighting the first context information related to the second identity differently than the first conditional probability that the second target is the second identity given the first target is the first identity.

19. The method of claim 14, wherein determining the likelihood that the first target, the second target, and the third target are the first possible identity, the second possible identity, and the third possible identity respectively further includes weighting the second probability differently than the first probability.

20. The method of claim 14, wherein determining the likelihood that the first target, the second target, and the third target are the first possible identity, the second possible identity, and the third possible identity respectively further includes multiplying the first probability, the second probability and the third probability.

* * * * *